United States Patent [19]

Crone

[11] Patent Number: 5,190,180
[45] Date of Patent: Mar. 2, 1993

[54] RESERVOIR FILL TUBE WITH ANTI-LEAK VALVE

[75] Inventor: James Crone, La Salle, Canada

[73] Assignee: United Technologies Corporation, Hartford, Conn.

[21] Appl. No.: 594,779

[22] Filed: Oct. 9, 1990

[51] Int. Cl.⁵ .............................................. B65D 90/00
[52] U.S. Cl. .................................................. 220/86.2
[58] Field of Search ..................... 220/86.1, 86.2, 85 F

[56] References Cited

U.S. PATENT DOCUMENTS

| | | | |
|---|---|---|---|
| 1,492,777 | 5/1924 | Clarke | 220/86.1 |
| 1,914,464 | 6/1933 | Simpson | 220/86.1 |
| 2,340,936 | 2/1944 | Cook | 220/86.1 X |
| 2,613,013 | 10/1952 | Van Pelt | 220/86.1 X |
| 3,458,085 | 7/1969 | Clemenson | 220/86.1 |
| 4,702,386 | 10/1987 | Boehmer et al. | 220/86.2 |
| 4,821,908 | 4/1989 | Yost | 220/86.2 |
| 4,946,060 | 8/1990 | Sherwood et al. | 220/86.2 |
| 4,955,950 | 9/1990 | Seiichi et al. | 220/86.2 X |

*Primary Examiner*—Steven M. Pollard

[57] ABSTRACT

A reservoir fill tube assembly (6) with an anti-leak valve includes a flapper valve (11) attached to the reservoir end (10) of the assembly (6). The valve (11) hangs open when reservoir pressure equals ambient pressure. When reservoir pressure exceeds ambient pressure and the reservoir (5) fluid attempts to exit through the fill tube (7), the flapper valve (11) closes and prevents leakage.

6 Claims, 2 Drawing Sheets

RESERVOIR FILL TUBE WITH ANTI-LEAK VALVE

DESCRIPTION

1. Technical Field

The present invention relates to reservoir fill tubes and more particularly to reservoir fill tubes with a means to prevent leakage.

2. Background Art

Dipsticks have long been incorporated into devices such as fuel tanks, gearboxes, and engines as liquid level measuring devices. Typically, dipstick assemblies consist of an open ended tube which extends into the fluid reservoir and a dipstick. The dipstick typically is a rod or a band of steel which fits into the tube and extends down into the fluid. The fluid "wets" the stick leaving a mark which can then be compared against a predetermined level mark etched on the stick. In some applications the dipstick is integrally attached to a cover which caps the exterior end of the tube.

Prior art teaches that the tube diameter may be made large enough to permit the fluid to be replenished directly through the dipstick tube. In these instances, the dipstick tube is commonly referred to as a reservoir fill tube with gage. Because the fluid in these applications is at or below ambient pressure, seals around the exterior of the tube where it contacts the reservoir are sufficient to prevent leakage. Moreover, if the dipstick or cover is not replaced after maintenance, only negligible amounts of oil will escape. Applications where the reservoir pressure is greater than ambient, however, require more extensive sealing.

Traditionally, devices containing reservoirs in which the interior pressure may exceed ambient pressure, use covers incorporating seals to prevent oil from escaping out the fill tube. These solutions are problematic, however, because they depend on the cover being replaced correctly after maintenance. For example, in the gearbox of a turboprop engine, if the fill cover is not reattached after maintenance, pressure within the gearbox develops as the engine starts and forces oil out the fill tube. Loss of lubricant, in this example, may result in serious damage to the engine.

DISCLOSURE OF THE INVENTION

It is the object of the present invention to provide a reservoir fill tube incorporating a device to prevent leakage out the tube in the event of the cover not being replaced correctly.

According to one aspect of the present invention, a reservoir fill tube assembly is provided with a flapper valve attached to the reservoir end of the assembly. Gravity opens the flapper valve when the reservoir pressure equals ambient pressure. This allows the fluid within the reservoir to enter the tube and wet the gage. In this position, the valve also permits fluid to be added to the reservoir. When the engine is under power, however, reservoir pressure builds up and exceeds ambient pressure. Consequently, if the tube is not sealed, fluid attempts to enter the tube and exit to the area at lower ambient pressure. As the fluid attempts to enter the tube, however, it forces the flapper valve shut, preventing the fluid from escaping. In addition, if the reservoir is at ambient pressure and inverted, the valve closes and thereby prevents leakage.

One of the advantages of the present invention is that the flapper valve incorporated into the end of the reservoir fill tube will seal and prevent leakage in the event that the tube cover is left off.

A further advantage provided by the flapper valve of the present invention is the ability to seal the tube without hindering normal measurement and replenishment functions.

BEST MODE FOR CARRYING OUT THE INVENTION

Figure 1:
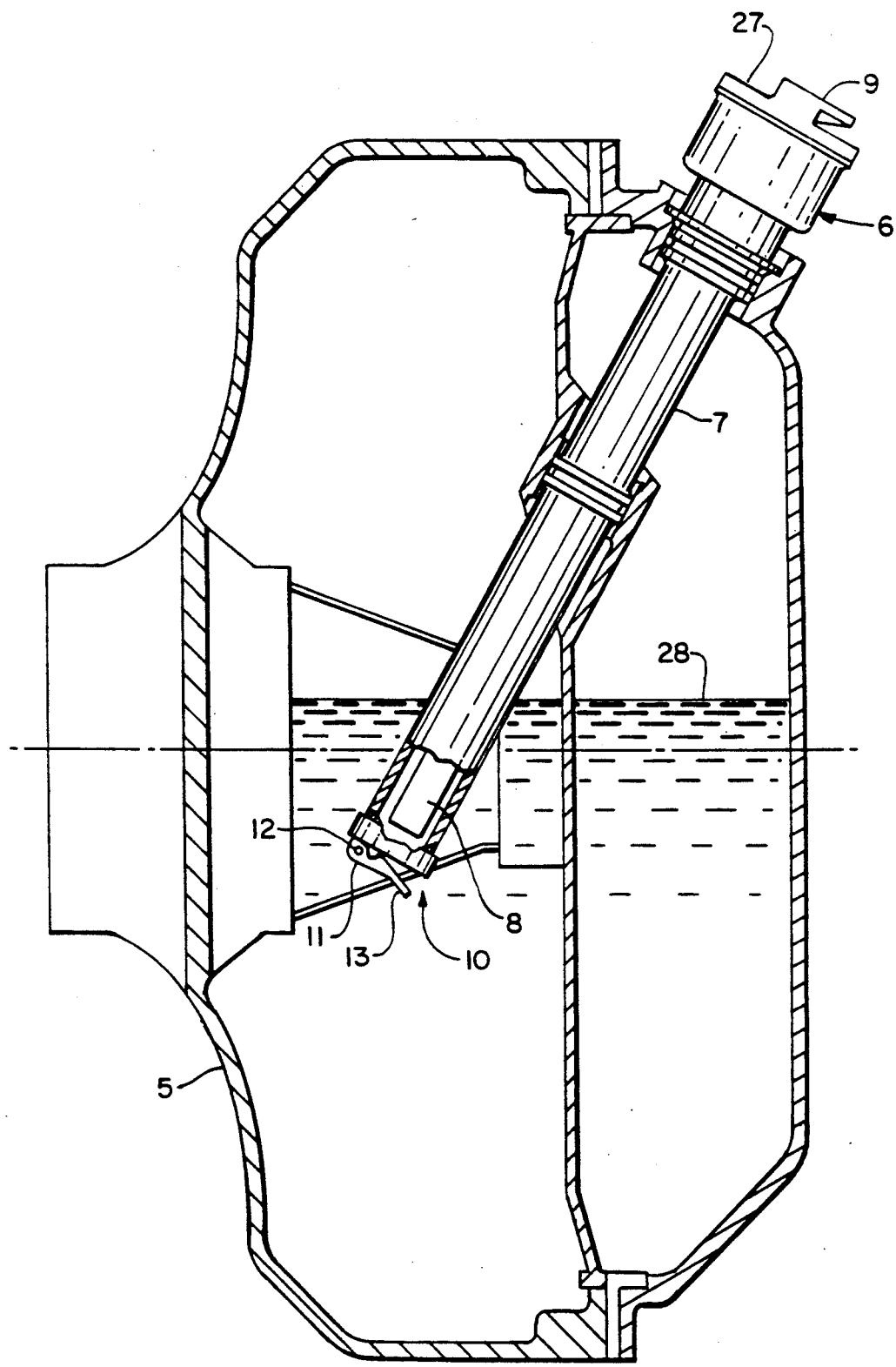
FIG. 1 is a sectional view of a turboprop gearbox showing the reservoir tube assembly in position.
Figure 2:
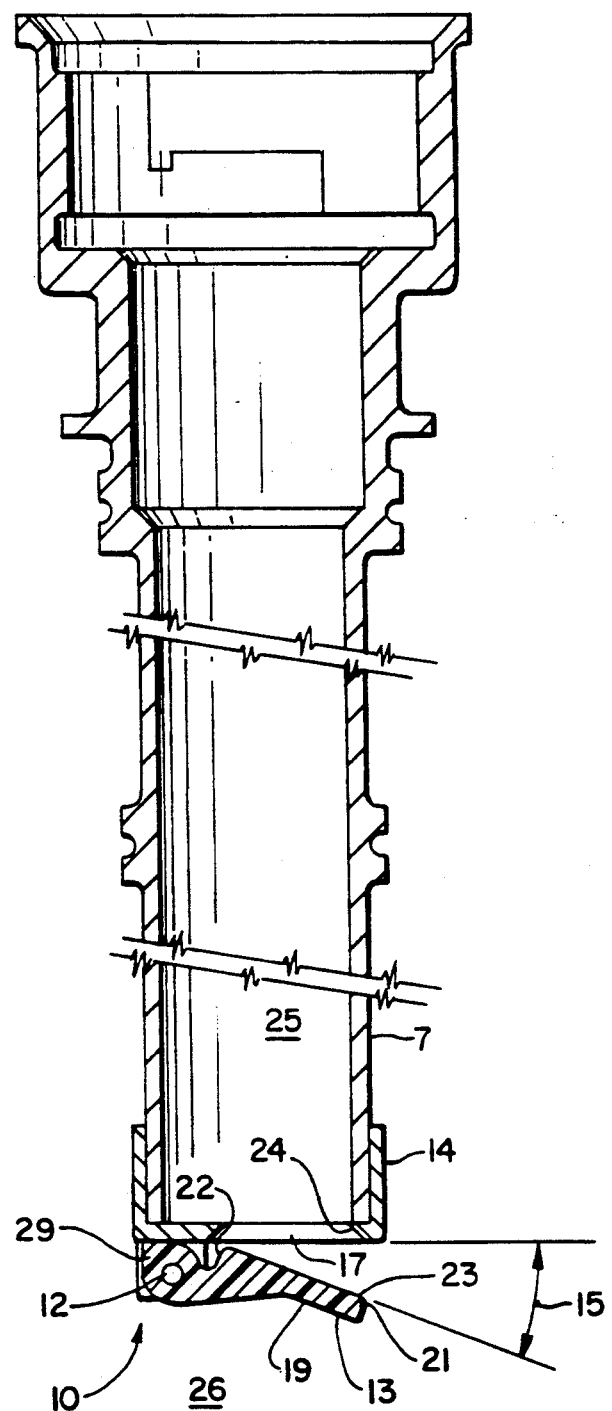
FIG. 2 is a more detailed sectional drawing of the tube with the flapper valve attached.

Referring to FIG. 1 and FIG. 2, a gearbox of a turboprop engine includes an fluid reservoir 5 having a predefined fluid capacity. Attached to and inserted in the reservoir 5 is a reservoir fill tube assembly 6. The fill tube assembly 6 comprises a tube 7, a gage 8, a cover 9, and a flapper valve 11 attached to the reservoir end 10 of the assembly 6. In the arrangement shown in FIG. 1, the reservoir end 10 of the assembly 6 extends beneath the fluid level line 28. The fluid level 28 of the reservoir 5 is indicated by the gage 8 positioned inside the tube 7.

The flapper valve 11 comprises a valve cap seat 14 which attaches to the reservoir end 10 of the assembly 6 and a valve cap 13. An orifice within the valve cap seat 14 allows fluid flow between the interior 25 of the tube 7 and the fluid reservoir 5. The valve cap 13, which in this instance includes a disk shaped cap section 19, attaches to the valve cap seat 14 by a hinge 12. The hinge 12, in this example, includes a lobe 29 which prevents the valve cap 13 from opening more than 90 degrees relative to the valve cap seat 14. When the exterior end 27 of the tube assembly 6 is not sealed and pressure builds within the reservoir 5, fluid inside the reservoir 5 contacts the valve cap 13 as it attempts to exit the reservoir 5 and enter the lower pressure interior 25 of the tube 7. The cap 13, sitting at an acute angle 15 relative to the valve cap seat 14, is pushed against the valve cap seat 14 by the force of the fluid. As a result, the valve cap 13 and the valve cap seat 14 form a seal preventing any further fluid from escaping. The flapper valve 11 can be made from a number of different rigid materials, for example, Teflon (a trademark of the E.I. duPont Co.).

The sealing surface 21 of the valve cap 13 is positioned on the perimeter 22 of the disk section 19 of the cap 13. The perimeter edge 23 closest to the valve cap seat 14 is radiused to provide a better contact surface for sealing. The valve cap seat 14 sealing surface is a beveled surface 24 contained inside the orifice 17 between the tube interior 25 and the reservoir interior 26. The beveled surface 24 opens in the direction of the valve cap 13 and accepts the radiused sealing surface 21 of the disk 19. Once the entire sealing surface 21 of the disk 19 contacts the beveled orifice 17, the seal is made.

When the engine is not under power, the pressure in the reservoir 5 equals ambient pressure and gravity causes the valve cap 13 to hang open, away from the valve cap seat 14. In this position, oil can move freely between the reservoir 5 and the interior 25 of the tube 7, where it wets the gage 8. The "wet mark" on the gage 8 provides a means to compare the actual reservoir oil level to that desired. When the engine is under power, however, the reservoir pressure builds up and exceeds the ambient pressure. Consequently, if the cover 9 is not replaced, fluid attempts to enter the tube 7 and exit to the lower ambient pressure. As the fluid attempts to enter the tube 7, however, it contacts the valve cap 13, hanging open at an acute angle 15 relative to the valve cap seat 14. The force of the fluid pushes the cap 13 closed and holds it there. When the engine is shut down and the pressure returns to ambient, gravity draws the cap 13 back open, away from the orifice 17, allowing oil to flow into the tube 7. Should replenishment be required, the open flapper valve presents no hindrance to the addition of oil to the reservoir.

I claim:

1. A reservoir fill tube assembly having a tube extending into a fluid reservoir such that one end of the assembly extends into the interior side of the reservoir and the other end extends outside of the reservoir, wherein the assembly further comprises:

a flapper valve, comprising a vale cap and a valve cap seat secured to one end of the tube, wherein said valve cap seat includes an orifice between the interior of said tube and the reservoir, and wherein said valve cap and valve cap seat are hingedly attached such that said valve cap closes under reservoir pressure greater than ambient, creating a seal between said valve cap and valve cap sat and wherein said flapper valve is oriented such that said valve cap hangs open in response to gravitational force when the reservoir pressure is equivalent to ambient;

means, disposed within the tube, for measuring the fluid level within the reservoir; and means, disposed between said valve cap and said valve cap seat for preventing said valve cap from opening more than 90° relative to said valve cap seat.

2. The reservoir fill tube assembly according to claim 1, wherein said valve cap comprises a circular disk shaped cap section, wherein a perimeter edge of said cap section is radiused, and wherein said valve cap seat includes a beveled surface within said orifice.

3. The reservoir fill assembly according to claim 2, wherein said means includes a dipstick.

4. The reservoir fill assembly according to claim 2, wherein said assembly further includes a sealing cover attachable to the exterior end of the tube.

5. The reservoir fill assembly according to claim 1, wherein said means includes a dipstick.

6. The reservoir fill assembly according to claim 1, wherein said assembly further includes a sealing cover attachable to the exterior end of the tube.

* * * * *

UNITED STATES PATENT AND TRADEMARK OFFICE
CERTIFICATE OF CORRECTION

PATENT NO. : 5,190,180

DATED : March 2, 1993

INVENTOR(S) : James Crone

It is certified that error appears in the above-identified patent and that said Letters Patent is hereby corrected as shown below:

Column 3, Line 26, "sat" should be --seat--

Signed and Sealed this

Sixteenth Day of November, 1993

Attest:

BRUCE LEHMAN

Attesting Officer    Commissioner of Patents and Trademarks